(12) United States Patent
Rosenzweig et al.

(10) Patent No.: US 9,276,271 B2
(45) Date of Patent: Mar. 1, 2016

(54) FUEL CELL SYSTEM HAVING A TOGGLE SWITCH

(75) Inventors: Alain Rosenzweig, Sait Maur des Fosses (FR); Kurt Rath, Herblay (FR); Andrew Curello, Hamden, CT (US)

(73) Assignees: Intelligent Energy Limited, Leicestershire (GB); The Commissariat a L'energie Atomique et Aux Energies Alternatives (CEA), Gif-sur-Yvette (FR)

( * ) Notice: Subject to any disclaimer, the term of this patent is extended or adjusted under 35 U.S.C. 154(b) by 137 days.

(21) Appl. No.: 13/991,058

(22) PCT Filed: Dec. 13, 2011

(86) PCT No.: PCT/US2011/064659
§ 371 (c)(1),
(2), (4) Date: Jul. 15, 2013

(87) PCT Pub. No.: WO2012/082747
PCT Pub. Date: Jun. 21, 2012

(65) Prior Publication Data
US 2013/0316259 A1    Nov. 28, 2013

Related U.S. Application Data

(60) Provisional application No. 61/422,934, filed on Dec. 14, 2010.

(51) Int. Cl.
| | |
|---|---|
| *H01M 8/04* | (2006.01) |
| *H01M 8/00* | (2006.01) |
| *H01M 16/00* | (2006.01) |
| *H01M 8/10* | (2006.01) |

(52) U.S. Cl.
CPC .......... *H01M 8/004* (2013.01); *H01M 8/04104* (2013.01); *H01M 8/04201* (2013.01); *H01M 8/04208* (2013.01); *H01M 8/04507* (2013.01); *H01M 8/04753* (2013.01); *H01M 8/1002* (2013.01); *H01M 16/006* (2013.01); *H01M 2008/1095* (2013.01); *H01M 2250/30* (2013.01); *Y02B 90/18* (2013.01); *Y02E 60/50* (2013.01)

(58) Field of Classification Search
USPC .................................................. 429/429, 513
See application file for complete search history.

(56) References Cited

U.S. PATENT DOCUMENTS

| | | |
|---|---|---|
| 4,885,437 A | 12/1989 | Tenniswood et al. |
| 5,458,989 A | 10/1995 | Dodge |
| 5,976,725 A | 11/1999 | Gamo et al. |

(Continued)

OTHER PUBLICATIONS

International Search Report and Written Opinion issued in connection with the corresponding International Application No. PCT/US2011/064659 on Apr. 17, 2012.

*Primary Examiner* — Patrick Ryan
*Assistant Examiner* — Lucas J. O'donnell
(74) *Attorney, Agent, or Firm* — The H.T. Than Law Group

(57) ABSTRACT

A fuel cell system (10) with a toggle switch (32) between an ON or OFF position is provided. In the OFF position, gas is purged from the fuel cell. The fuel cell (12) may surround the fuel source (14) with the cathode side of the fuel cell facing the fuel source. Additionally, both the fuel cell (12) and the fuel source (14) may have similar form factor to maximize the available space. Preferably the form factor is substantially an oval shape. The fuel cell system may also have a pressure regulator (26).

13 Claims, 5 Drawing Sheets

(56) References Cited

U.S. PATENT DOCUMENTS

| | | | |
|---|---|---|---|
| 5,983,986 A * | 11/1999 | Macintyre et al. | 165/9 |
| 5,991,670 A * | 11/1999 | Mufford et al. | 701/22 |
| 6,506,511 B1 | 1/2003 | Lakeman et al. | |
| 6,713,201 B2 | 3/2004 | Bullock | |
| 7,033,688 B2 | 4/2006 | Penev | |
| 7,223,489 B2 | 5/2007 | Ueda et al. | |
| 7,344,571 B2 | 3/2008 | Bae | |
| 7,442,462 B2 | 10/2008 | Pristash | |
| 7,470,477 B2 | 12/2008 | Zizelman et al. | |
| 2004/0035055 A1 | 2/2004 | Zhu et al. | |
| 2004/0058204 A1 | 3/2004 | Tamamura et al. | |
| 2005/0064266 A1 | 3/2005 | Abdou et al. | |
| 2006/0115709 A1 | 6/2006 | Badding et al. | |
| 2006/0210858 A1 | 9/2006 | Warrier et al. | |
| 2007/0072023 A1 | 3/2007 | Nakamura et al. | |
| 2007/0281194 A1 * | 12/2007 | Cortright et al. | 429/26 |
| 2008/0173364 A1 * | 7/2008 | Degner et al. | 137/625.31 |
| 2009/0136788 A1 * | 5/2009 | Koenig et al. | 429/13 |
| 2009/0258266 A1 | 10/2009 | Jang et al. | |
| 2009/0311561 A1 * | 12/2009 | Rosenzweig et al. | 429/13 |
| 2009/0325009 A1 | 12/2009 | Kim et al. | |

* cited by examiner

FUEL CELL SYSTEM HAVING A TOGGLE SWITCH

FIELD OF THE INVENTION

This invention generally relates to a fuel cell system and in particular a system comprising a fuel cell and is adapted to receive a hydrogen storage device or a hydrogen generating device. The hydrogen is regulated and transported to the fuel cell where it is converted to electrical energy, which can be used to power any electronic device or to charge a battery or device.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuels, as well as portable power storage, such as lithium-ion batteries. In particular, one use of fuel cells is as a fuel supply for a charging device to replenish the electrical charge of consumer electrical devices such as cell phones, personal digital assistants, personal gaming devices, global positioning devices, rechargeable batteries, etc.

Known fuel cells include alkali fuel cells, polymer electrolyte fuel cells, phosphoric acid fuel cells, molten carbonate fuel cells, solid oxide fuel cells and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$) at a first pressure and temperature and released to fuel a fuel cell at a second pressure and temperature.

Most hydrogen fuel cells have a proton exchange membrane or polymer electrolyte membrane (PEM), which allows the hydrogen's protons to pass through but forces the electrons to pass through an external circuit, which advantageously can be a cell phone, a personal digital assistant (PDA), a computer, a power tool or any device that uses electron flow or electrical current. The fuel cell reaction can be represented as follows:

Half-reaction at the anode of the fuel cell:

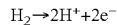

Half-reaction at the cathode of the fuel cell:

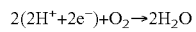

Generally, the PEM is made from a polymer, such as Nafion available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Generally, the hydrogen fuel source is located apart from the fuel cell, which typically comprises stacks of individual cells. This arrangement does not optimize the use of limited space, particularly for portable consumer electronic equipment. The patent literature includes disclosure of the fuel source being enclosed by the fuel cell. See U.S. Pat. No. 6,506,511, US 2009/0258266 and U.S. Pat. No. 7,442,462. However, these references do not maximize the spacing between the fuel source and the fuel cell. Hence, there remains a need for a compact fuel cell system that optimizes the use of available space.

SUMMARY OF THE INVENTION

The present invention is directed to a fuel cell system (10) with a toggle switch (32) between an ON or OFF position. In the OFF position, gas is purged from the fuel cell. The fuel cell (12) may surround the fuel source (14) with the cathode side of the fuel cell facing the fuel source. Additionally, both the fuel cell (12) and the fuel source (14) may have similar form factor to maximize the available space. Preferably the faun factor is substantially an oval shape. The fuel cell system may also have a pressure regulator (26).

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE INVENTION

Figure 1:
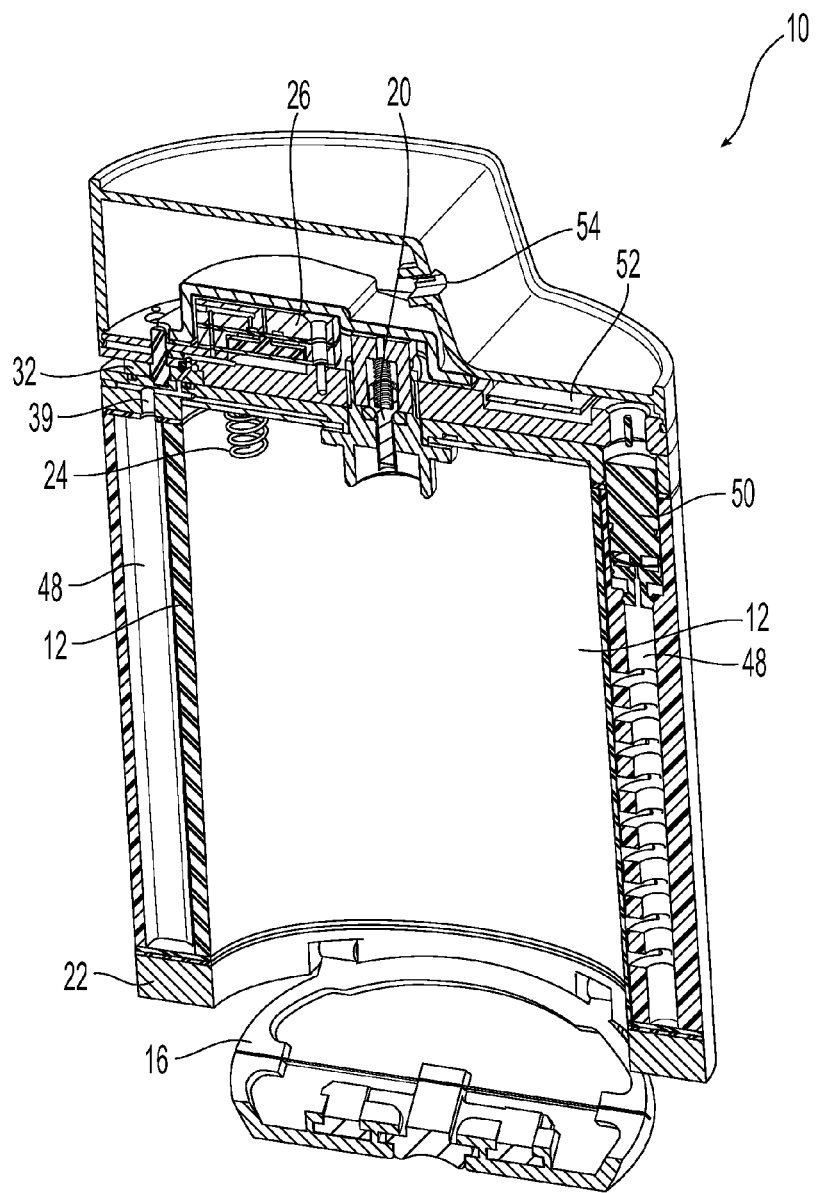
FIG. 1 is a cross-sectional view of an inventive fuel cell system.
Figure 2:
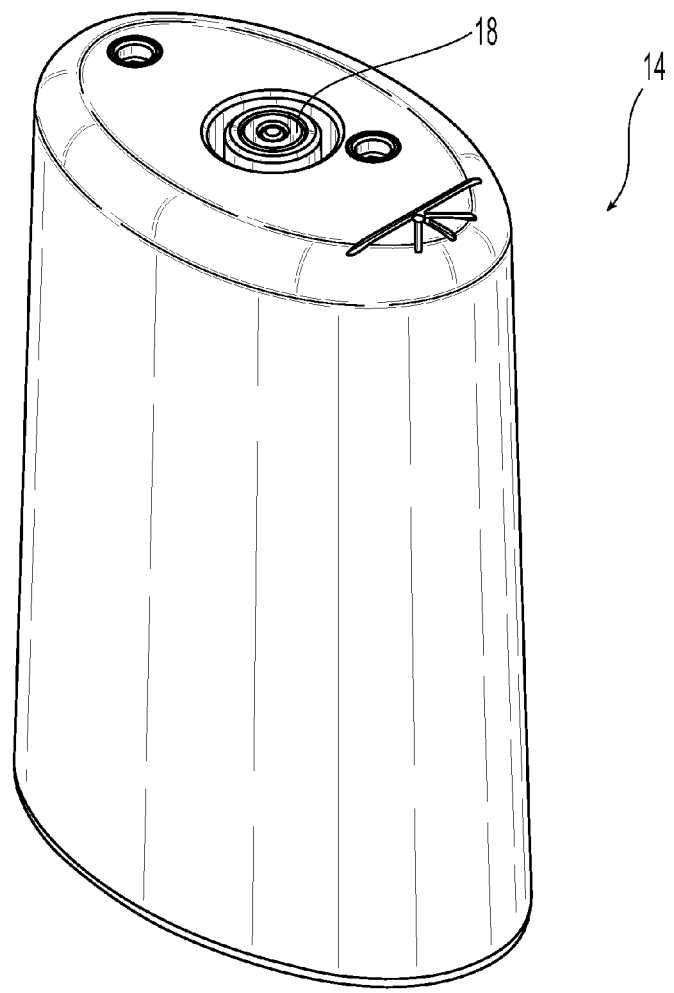
FIG. 2 is a perspective view of an exemplary hydrogen generating or storage device that can be used with the fuel cell system of FIG. 1.

FIG. 1 depicts a fuel cell system 10, which could be a battery charger. As shown, fuel cell system 10 having a fuel cell 12 adapted to receive a hydrogen fuel source 14, which is illustrated in FIG. 2. Hydrogen fuel source 14 may store compressed hydrogen in any form or in a hydrogen absorbent hydride discussed above and may generate hydrogen in situ by reforming a fuel such as methanol, other alcohols, hydrocarbon(s), or from a chemical reaction between a metal hydride, such as, sodium borohydride, aluminum hydride or magnesium hydride, etc., and water or alcohol. Exemplary hydrogen sources 14 are described in U.S. design patent application Ser. No. 29/359,037 filed on Apr. 5, 2010, U.S. non-provisional patent application Ser. Nos. 12/829,801 and 12/829,827 filed no Jul. 2, 2010 and published international patent application nos. WO 2010/051557 and WO 2010/075410. All of these patent applications are incorporated herein by reference in their entireties.

In accordance with a first embodiment of the present invention, fuel cell 12 is preferably sized and dimensioned to wrap loosely around hydrogen fuel source 14, and matches the outer shape of hydrogen fuel source 14. Hydrogen fuel source 14 is inserted into system 10 from the bottom when lid 16 is opened as shown in FIG. 1, until hydrogen valve 18 of hydrogen fuel source 14 mates with corresponding hydrogen valve 20 of fuel cell system 10. Suitable hydrogen valves 18 and 20 are discussed in published international patent application nos. WO 2010/051557 and WO 2010/075410 discussed above, and in published international patent publications WO 2009/026441 and WO 2009/026439. All of these patent applications are incorporated herein by reference in their entireties. However, any known hydrogen valves can be used in the present invention.

It is noted that lid 16 does not form a seal with bottom 22 of fuel cell system 10, so that necessary oxidant, e.g., oxygen from atmospheric air, may enter system 10 to react on the cathode side, which is the inside surface, of fuel cell 12. Alternatively, oxidant may be stored and transported to the cathode side of fuel cell 12. Optionally, spring 24 is provided and is compressed when hydrogen fuel source 14 is inserted to store energy, and compressed spring 24 assists in the release and withdrawal of hydrogen fuel source 14 from system 10.

After hydrogen fuel is transported through valves 18 and 20, the pressure of the fuel is regulated by pressure regulator 26. Regulator 26 takes hydrogen fuel at various inlet pressures at inlet 28, which is substantially the outlet of hydrogen valve 20, and modifies the pressure so that hydrogen fuel preferably exits regulator 26 at regulator outlet 30 at a substantially steady pressure. An advantage of using regulator 26 is that fuel cell 12 receives hydrogen fuel at a substantially steady pressure, which maximizes the performance of fuel cell 12, as well as its longevity. Exemplary regulators are described in US published patent application US 2006/0174952, which is incorporated herein by reference in its entirety, and in published international patent publications WO2009/026441 and WO2009/026439.

Figure 3:
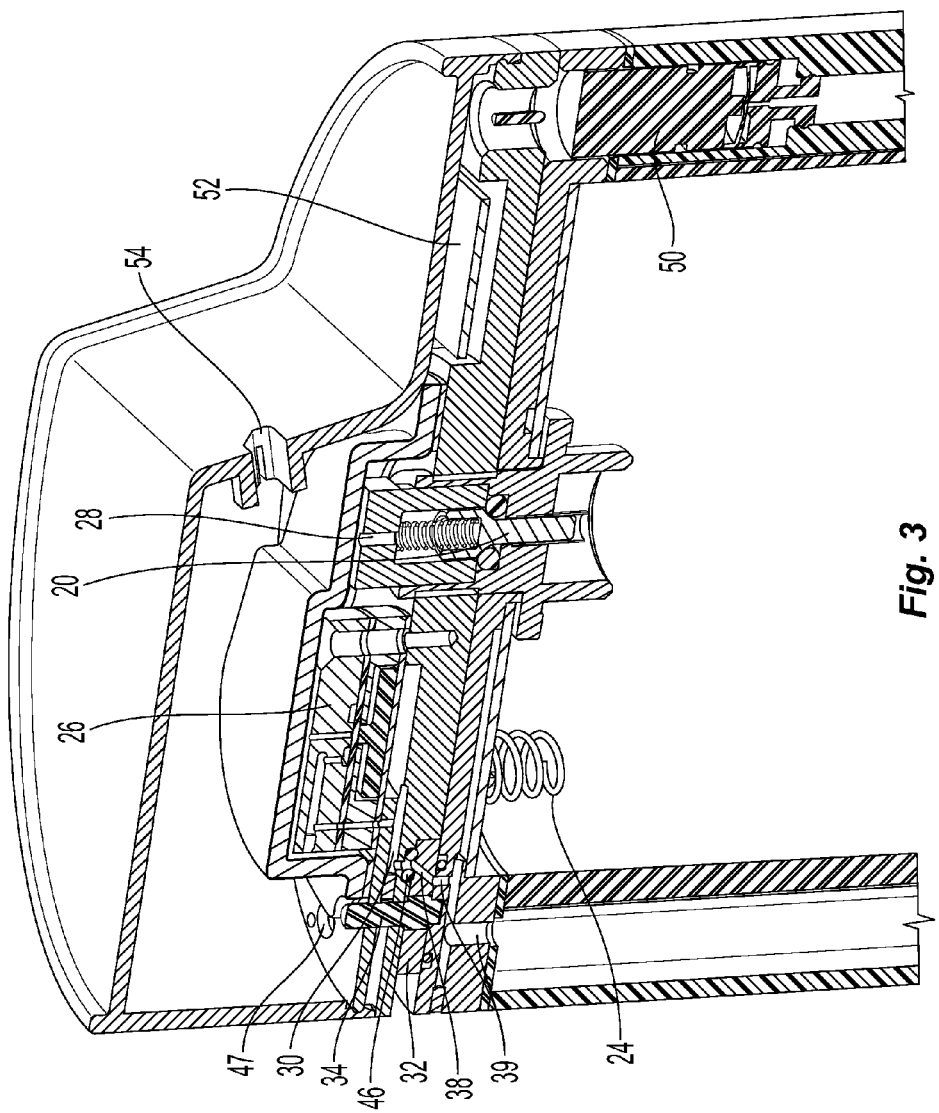
FIG. 3 is an expanded cross-sectional view of the fuel cell charging device of FIG. 1 showing the top portion thereof.
Figure 4:
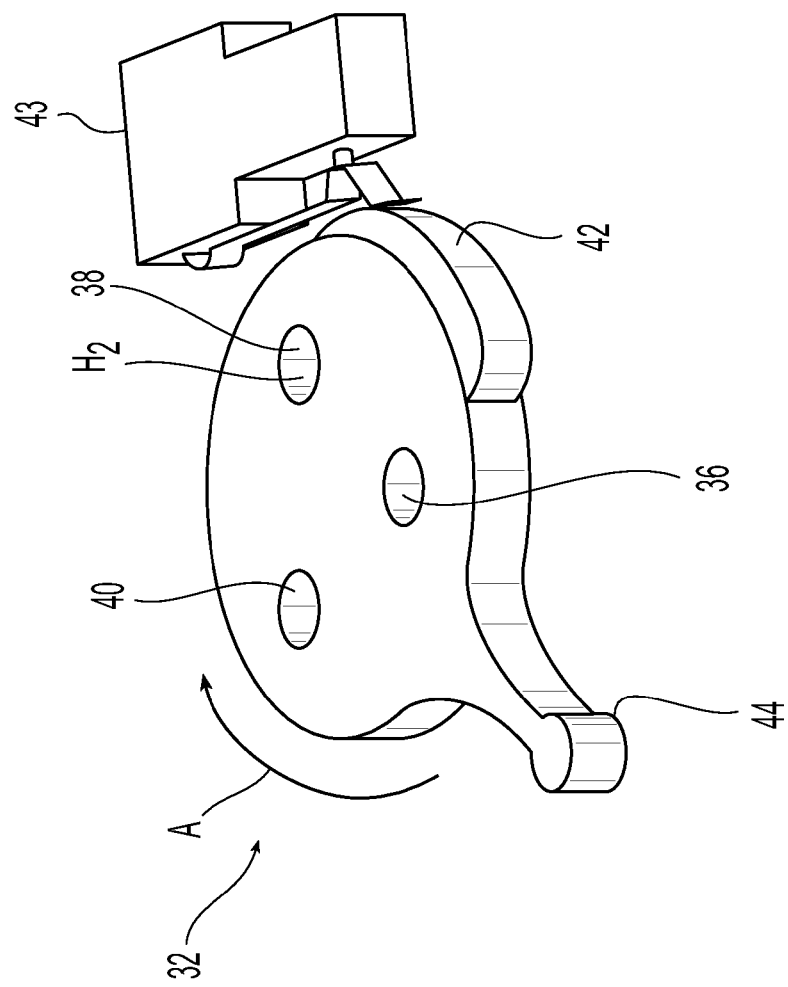
FIG. 4 is a perspective view of a toggle switch used with the current invention.

Proximate to and downstream from regulator outlet 30 within fuel system 10, a toggle switch 32, best shown in FIG. 4, is rotatably mounted to pin 34. Toggle switch 32 comprises at least three apertures. Aperture 36 is sized and dimensioned to fit around pin 34 to support rotational movement of toggle switch 32. Fuel aperture 38 is provided to allow hydrogen fuel from outlet 30 to enter the anode side, or the outside surface, of fuel cell 12. Purge aperture 40 is provided to allow excess hydrogen to exit or to be purged from manifold 48 of fuel cell 12, so that excess water vapor or water droplet byproducts and/or other gaseous impurities are removed from fuel cell 12 to prevent or minimize the formation of inactive spots on the catalyst substrate on fuel cell 12. Toggle switch 32 further comprises ram surface 42 and finger-actuatable portion 44. Toggle switch 32 can be rotated between an ON position, as shown in FIG. 4, where fuel aperture 38 aligns with regulator outlet 30 and fuel cell inlet 39 to let hydrogen fuel through the toggle switch, and an OFF position. In this position, ram surface 42 pushes a biased arm of electrical ON-OFF switch 43 to the ON position. This signifies to fuel cell system 10 that fuel is being transported to fuel cell 12 and that electricity is being produced. A sealing member 46, such as an 0-ring, is provided between fuel aperture 38 and regulator outlet 30 to ensure that hydrogen fuel does not escape. As shown in FIG. 3, aperture 38 is angularly positioned; however, aperture 38 can be linear or curvilinear and be orientated in any direction.

Toggle switch 32 can be rotated to the OFF position, for example, in the direction of arrow A to misalign aperture 38 from regulator outlet 30 to disrupt the flow of hydrogen fuel. Also in the OFF position, ram surface 42 no longer aligns with the biased arm of ON-OFF switch 43 and the switch is turned to the OFF position, and regulator outlet 30 now is directly opposite from a solid portion of toggle switch 32 causing the flow of hydrogen fuel to stop. In the OFF position, another electrical contact may be provided to signal a preferred shut-down sequence to begin, and in the ON position another electrical contact may initiate a preferred start-up sequence, other software or firmware. Such preferred sequences include "hot-swap" procedures, and exemplary "hot-swap" procedures are disclosed in U.S. Pat. No. 7,655,331, which is incorporated herein by reference in its entirety. Preferably, the arm on switch 43 is biased to the OFF position. Fuel cell inlet 39 is now aligned with purge aperture 40 and un-reacted hydrogen can be vented from the anode side of fuel cell 12. In one embodiment, vent aperture 40 is aligned with vent 47 to vent unused hydrogen fuel.

Toggle switch 32 can be an electrical or electronic switch, and the present invention is not limited to any particular toggle switch.

Referring again to FIG. 1, after passing through fuel cell inlet 39 hydrogen fuel enters hydrogen manifold 48, which surrounds the outside surface or the anode of fuel cell 12. Alternatively, the cathode side of the fuel cell may be on the outer surface of the fuel cell and manifold 48 supplies hydrogen to the anode on the inside surface of the fuel cell. Hydrogen and oxygen react at fuel cell 12 to produce electricity as explained above. Hydrogen manifold may also have valve 50, which can be a purge valve to purge un-reacted hydrogen when system 10 is shut down. This allows the hydrogen to be removed from the anode side during non-operation so that the un-reacted hydrogen and/or any potentially toxic gas(es) that may form would not adversely affect the catalyst substrate or activities thereon. Valve 50 can also be a check valve that opens when the pressure within hydrogen manifold 48 exceeds a certain threshold. Valve 50 may also purge water vapor/droplet byproduct produced by the fuel cell reaction.

In accordance with another aspect of the present invention, fuel cell system 10 may also have integrated circuit chip 52, which may include memory storing capacity. IC chip 52 may contain preloaded software to control the operation of fuel cell system 10, including but not limited to, preferred start-up and shut-down sequences, software and firmware discussed above. IC chip 52 may also contain software updates for the electronic devices powered by fuel cell system 10. Additionally or alternatively IC 52 chip stores information, such as fuel cell type, fuel type, fuel gage, temperature gage, fuel concentration gage, fuel purity level, etc., that is necessary to the operation of fuel cell system 10. An electronic device powered by fuel cell system 10 may have its own processor access the information stored on IC chip 52 and may use the software stored on IC chip 52. Suitable memory devices and processors for fuel cell applications are described in U.S. Pat. No. 7,655,331, previously incorporated by reference.

As stated, fuel cell system 10 can directly power any device that needs electricity. Fuel cell system may have a power regulation chip to control the electrical output level. Such power regulation chip and fuel cell system are described in published U.S. patent application no. US 2009/0311561, which is incorporated herein by reference in its entirety.

Also, fuel cell system 10 can be a charging device that recharges stand-alone rechargeable batteries or rechargeable batteries that are stored within electronic devices. Fuel cell system 10 may also charge an internal battery of capacitors to buffer the output voltage and current or maintain an internal clock or provide standby power when system 10 is not in operation. For example, system 10 comprises a USB slot 54 (internal electronic connections are omitted for clarity) suitable for connecting fuel cell system 10 to a rechargeable battery.

In another aspect of the present invention, to maximize available space fuel cell system 10 has a shape that is similar to the shape of fuel cartridge 14. In other words, both fuel cell system 10 and fuel cartridge 14 have similar form factor, at least on the side, e.g., not including the top and bottom surfaces, of the devices. Preferably, both devices have an oval shape as shown in FIGS. 1 and 2. Oval shapes are advantageous because they provide wider surface areas for a given volume, for example, as compared to cylindrical or circular shapes. Fuel cell 12 would generate more electricity with more surface areas. Furthermore, oval shapes are more ergonomic, for example, as compared to diamond cross sections which provide higher surface areas similar to ovals. Fuel cell 12 may have the cathode on the inside surface or on the outside surface. Preferably, the space between fuel cell 12 and fuel supply 14 is also minimized.

Figure 5:
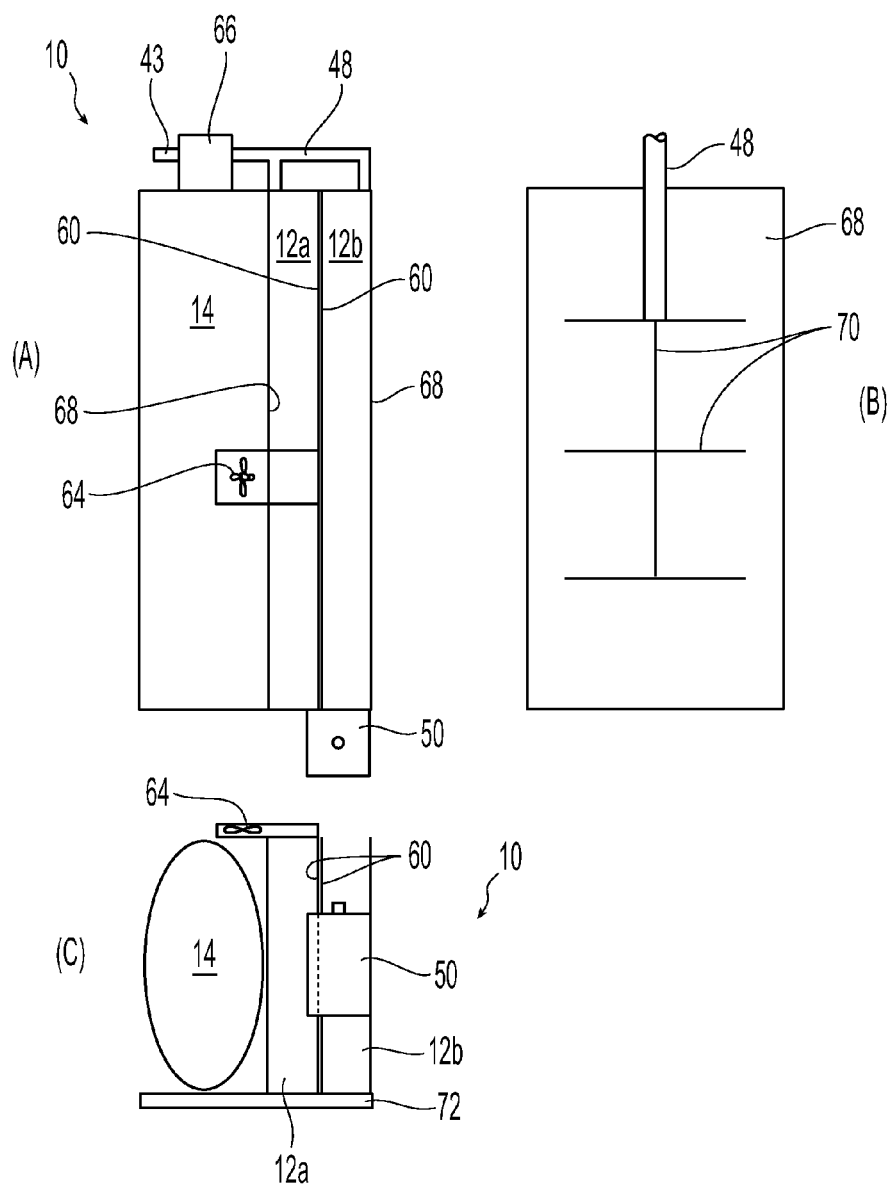
FIG. 5A is a front view of another embodiment of the present invention.
FIG. 5B is an anode side of a fuel cell of the fuel cell system of FIG. 5A.
FIG. 5C is a bottom view of FIG. 5A.

Another embodiment of fuel cell system 10 is illustrated in FIGS. 5A-5C. In this embodiment, fuel cell 12 of fuel cell system 10 comprises at least one pair of fuel cells 12a and 12b wherein fuel cells 12a and 12b are arranged so that cathode side 60 or the oxidant side of fuel cells 12a and 12b are facing each other, as shown in FIGS. 5A and 5C. A space is provided between the two cathode sides 60, so that fan 64 can provide forced and controlled atmospheric air to bring oxidant (oxygen) to cathode sides 60. Preferably, a humidity sensor is provided in said space to monitor and control the performance of fuel cells 12a and 12b. Fan 64 preferably has variable speed depending on the production rate of electricity or on the consumption rate of hydrogen. The controller, which can be located in IC chip 52, can control the speed of fan 64. Fan 64 is preferably powered by fuel cells 12a and 12b. Alternatively, fan 64 is powered by a battery or other electrical storage devices at least until fuel cells 12a and 12b are operational, or fan 64 can be powered by a battery or the like on a full time basis.

Similar to the embodiment shown in FIGS. 1-4, in this embodiment hydrogen fuel source 14 is connected to fuel cell system 10 via hydrogen valves, pressure regulator and toggle switch, collectively illustrated as element 66 with an ON-OFF switch 43 operationally connected thereto. Manifold 48 in this embodiment has two branches to bring hydrogen fuel to anode 68 of each of fuel cells 12a and 12b, as best shown in FIGS. 5A and 5B. Manifold 48 preferably has multiple branches 70 to distribute hydrogen fuel more evenly. Suitable hydrogen distribution methodology is also described in U.S. patent application no. US 2009/0311561, discussed above.

Purge/vent valve 50 connected to both fuel cells 12a and 12b, similar to that discussed in the first embodiment, is provided in this embodiment as shown. Electrical component (s) can be provided, for example, as element 72 in FIG. 5C. Fuel cell system 10, as shown in FIGS. 5A-5C, can be enclosed in a housing similar to the embodiment of FIGS. 1-4.

An advantage of the designs of the present invention is when hydrogen fuel source 14 produces hydrogen fuel via a chemical reaction between a metal hydride, such as sodium borohydride, and water, which is exothermic, the produced heat can be used to control the temperature and/or humidity of fuel cell 12 during operation. Since the cathode or oxidant side of fuel cell 12 is internal to fuel cell system 10, atmospheric air can be warmed to a more preferred temperature range for fuel cell 12 and atmospheric air's relative humidity can also be controlled with the produced heat.

Another advantage of the present designs is that the cathode side of fuel cell 12 is protected from possible physical damages caused by exposure to the outside environment or by direct contacts from the users, since it is internal to fuel cell system 10. This increases the longevity and performance of fuel cell 12. Fuel cells are air breathing and their performances can be significantly affected by the quality of atmospheric air. Also, when hydrogen fuel source 14 does not generate heat or too much heat relative to fuel cell system 10, hydrogen fuel source 14 may act as a heat sink. Additionally, hydrogen fuel source 14 may provide additional structural integrity to fuel cell system 10, e.g., during possible impacts during use.

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. Additionally, components or features of one embodiment can be utilized in other embodiments.

The invention claimed is:

1. A fuel cell system comprising,
a replaceable hydrogen fuel supply;
a fuel cell; and
a toggle switch comprising a rotatable flat cylindrical body, with a cam along a portion of its edge; at least one opening through the cylindrical body; and an actuator portion;
wherein when the actuator portion is moved into a first position hydrogen is provided to the fuel cell and an electrical ON/OFF switch for the fuel cell system is activated by the cam, and when the actuator is moved to a second position hydrogen is purged from the fuel cell.

2. The fuel cell system of claim 1 further comprising an integrated circuit chip.

3. The fuel cell system of claim 2, wherein the integrated circuit chip comprises information about the fuel cell system or software to operate the fuel cell system.

4. The fuel cell system of claim 1 wherein the fuel cell system generates electricity to charge a stand alone battery or a battery stored within an electronic device.

5. The fuel cell system of claim 1, wherein the fuel cell comprises two fuel cells wherein the cathode sides of the two fuel cells are facing each other.

6. The fuel cell system of claim 5, wherein a fan provides an oxidant to the cathode sides of the two fuel cells.

7. The fuel cell system of claim 6, wherein the fan has variable speed.

8. The fuel cell system of claim 1 further comprising a humidity sensor.

9. The fuel cell system of claim 1, wherein the fuel cell surrounds the replaceable hydrogen fuel supply, wherein the cathode side of the fuel cell faces the fuel supply, and wherein a pressure regulator controls the pressure from the fuel supply.

10. The fuel cell system of claim 1, wherein the fuel cell surrounds the replaceable hydrogen fuel supply, wherein the fuel supply and the fuel cell have similar shape and wherein the shape is substantially oval, and wherein a pressure regulator controls the pressure from the fuel supply.

11. The fuel cell system of claim 1, wherein the at least one opening comprises a fuel aperture and a purge aperture.

12. The fuel cell system of claim 11, wherein the fuel aperture is fluidly connected to an outlet of a pressure regulator and to an anode of the fuel cell in the first position.

13. The fuel cell system of claim 11, wherein the purge aperture is fluidly connected to the fuel cell and to a vent in the second position.

* * * * *